(12) United States Patent
Yarlagadda et al.

(10) Patent No.: US 11,551,178 B2
(45) Date of Patent: Jan. 10, 2023

(54) APPARATUSES AND METHODS FOR REGULATION OFFENDING MODEL PREVENTION

(71) Applicant: Wells Fargo Bank, N.A., San Francisco, CA (US)

(72) Inventors: Ramesh Yarlagadda, Charlotte, NC (US); Pierre Arbadjian, Matthews, NC (US); Andrew J. Garner, IV, State Road, NC (US); Ramanathan Ramanathan, Bellevue, WA (US); Abhijit Rao, Irvine, CA (US); Joon Maeng, Newcastle, WA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 16/874,199

(22) Filed: May 14, 2020

(65) Prior Publication Data
US 2021/0357843 A1    Nov. 18, 2021

(51) Int. Cl.
| G06Q 10/06 | (2012.01) |
| G06Q 30/00 | (2012.01) |
| G06N 20/00 | (2019.01) |
| G06Q 50/26 | (2012.01) |
| G06Q 40/02 | (2012.01) |

(52) U.S. Cl.
CPC ....... G06Q 10/06395 (2013.01); G06N 20/00 (2019.01); G06Q 30/0185 (2013.01); G06Q 40/02 (2013.01); G06Q 50/26 (2013.01)

(58) Field of Classification Search
CPC .............................................. G06Q 10/06395
See application file for complete search history.

(56) References Cited

U.S. PATENT DOCUMENTS

| 2009/0299896 | A1* | 12/2009 | Zhang | G06Q 40/08 705/38 |
| 2014/0129397 | A1* | 5/2014 | Lazerson | G06Q 40/02 705/30 |
| 2020/0273046 | A1* | 8/2020 | Biswas | G06Q 30/018 |

OTHER PUBLICATIONS

Veale et al., Fairer machine learning in the real world: Mitigating discrimination without collecting sensitive data, 2017, Big Data and Society, all pages (Year: 2017).*

* cited by examiner

*Primary Examiner* — Rutao Wu
*Assistant Examiner* — Zahra Elkassabgi
(74) *Attorney, Agent, or Firm* — Womble Bond Dickinson (US) LLP

(57) ABSTRACT

Apparatuses, methods, and computer program products are provided for improved model compliance. An example method includes receiving a product model that is generated from user data associated with a plurality of users and receiving a first regulation offending model that is non-compliant with respect to a first regulatory factor. The method also includes analyzing the product model with the first regulation offending model and generating a first regulation compliance score for the product model with respect to the first regulatory factor. The method further includes determining whether the first regulation compliance score satisfies a first regulatory factor threshold. In an instance in which the first regulation compliance score fails to satisfy the first regulatory factor threshold, the method includes generating a first violation notification or modify the product model.

20 Claims, 5 Drawing Sheets

APPARATUSES AND METHODS FOR REGULATION OFFENDING MODEL PREVENTION

TECHNOLOGICAL FIELD

Example embodiments of the present disclosure relate generally to data modeling and, more particularly, to model regulatory compliance.

BACKGROUND

Financial institutions and other entities often collect or otherwise have access to a large amount of user data. This user data may be utilized by these entities to generate models (e.g., machine learning models or otherwise) for providing products to their customers. These institutions, however, are also subject to a number of regulations that limit the factors that may be considered in identifying/selecting customers as well as the model's effect on customers in protected classes

BRIEF SUMMARY

As described above, financial institutions and other entities may utilize a variety of models in the normal course of providing products to their customers. By way of example, a model may be created and used to identify or select customers for receiving a particular mortgage product, credit card, or the like. In order to generate these models, these entities may collect or otherwise access user data, and this user data may include various private information (e.g., age, gender, income, geographic location, ethnicity, etc.) associated with users. These institutions, however, are also subject to a number of regulations that limit the factors that may be considered in identifying/selecting customers as well as the model's effect on customers in protected classes. For example, the Fair Housing Act (FHA), the Equal Credit Opportunity Act (ECOA), and related fair lending regulations may prohibit unfair and discriminatory practices on the basis of race, religion, national origin, gender, martial status, age, and the like.

In many instances, financial institutions may generate models for identifying and selecting customers without using user data that implicates fair lending regulations. Said differently, financial institutions and other entities may reduce or remove user data related to race, religion, national origin, gender, martial status, age, and the like when generating models in an attempt to actively prevent discrimination. However, other data used in generating models (e.g., geographic location, employment history, home ownership, spending habits, etc.) may result in a discriminatory effect or outcome that is unintentional. By way of example, although user data related to home ownership and/or geographic location may not explicitly relate to one or more protected classes described above, using this user data may result in an unintentional disparate impact or outcome on customers of a particular age, religion, or race.

To solve these issues and others, example implementations of embodiments of the present disclosure may utilize regulation offending models designed to identify vulnerable regulatory factors associated with user data of a product model (e.g., machine learning model) to prevent unintentional discriminatory outcomes of the product model. In operation, embodiments of the present disclosure may receive a product model that includes user data associated with a plurality of users. A regulation offending model that is non-compliant with respect to a first regulatory factor may be used to analyze the product model to generate a regulation compliance score related to said regulatory factor. In instances in which the regulation compliance score fails to satisfy one or more compliance-related thresholds, embodiments of the present disclosure may generate a violation notification and/or modify the product model. In this way, the inventors have identified that the advent of emerging computing technologies have created a new opportunity for solutions for improving model compliance which were historically unavailable. In doing so, such example implementations confront and solve at least two technical challenges: (1) they determine potential regulatory factor vulnerabilities associated with machine learning techniques, and (2) they dynamically adjust user data modeling to ensure regulation related compliance.

As such, apparatuses, methods, and computer program products are provided for improved model compliance. With reference to an example method, the example method may include receiving, via a computing device, a product model that is generated from user data associated with a plurality of users. The method may also include receiving, via the computing device, a first regulation offending model that is non-compliant with respect to a first regulatory factor. The method may also include analyzing, via factor analysis circuitry of the computing device, the product model with the first regulation offending model and generating, via outcome evaluation circuitry of the computing device, a first regulation compliance score for the product model with respect to the first regulatory factor.

In some embodiments, the method may further include determining, via the outcome evaluation circuitry, whether the first regulation compliance score satisfies a first regulatory factor threshold. In an instance in which the first regulation compliance score fails to satisfy the first regulatory factor threshold, the method may further include generating, via communications circuitry of the computing device, a first violation notification. In other embodiments, the method may include modifying, via the factor analysis circuitry, the product model in an instance in which the first regulation compliance score fails to satisfy the first regulatory factor threshold.

In some embodiments, analyzing the product model with the first regulation offending model may include iteratively analyzing the product model, via the factor analysis circuitry, to determine a plurality of regulation compliance scores for the first regulatory factor. In some instances, generating the first regulation compliance score for the first regulatory factor may include averaging the plurality of regulation compliance scores. In other instances, generating the first regulation compliance score for the first regulatory factor may include selecting the maximum absolute value from amongst the plurality of regulation compliance scores.

In some embodiments, the method may include receiving, via the computing device, a second regulation offending model that is non-compliant with respect to a second regulatory factor. The method may further include analyzing, via the factor analysis circuitry, the product model with the second regulation offending model and generating, via the outcome evaluation circuitry, a second regulation compliance score for the second regulatory factor.

In some further embodiments, the method may include determining, via the outcome evaluation circuitry, whether the second regulation compliance score satisfies a second regulatory factor threshold. In an instance in which the second regulation compliance score fails to satisfy the second regulatory factor threshold, the method may include modifying, via the factor analysis circuitry, the product model.

In some still further embodiments, the method may also include analyzing, via the factor analysis circuitry, the modified product model with the first regulation offending model and generating, via the outcome evaluation circuitry, a modified first regulation compliance score for the first regulatory factor.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
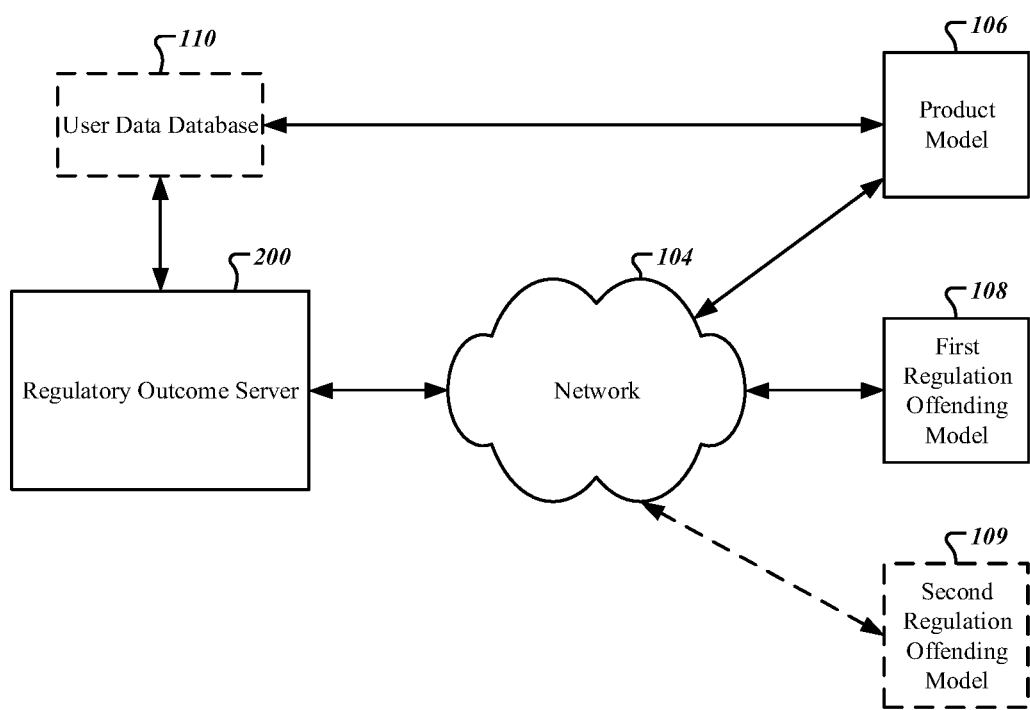
FIG. 1 illustrates a system diagram including devices that may be involved in some example embodiments described herein.

Some embodiments of the present disclosure will now be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a regulatory outcome server as an example "apparatus." However, elements of the apparatus described herein may be equally applicable to the claimed method and computer program product. Thus, use of any such terms should not be taken to limit the spirit and scope of embodiments of the present disclosure.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "model," "machine learning model," and the like refer to mathematical models based upon training or sample data (e.g., user data as described hereafter) and configured to perform various tasks without explicit instructions. Said differently, a machine learning model may predict or infer tasks to be performed based upon training data, learning algorithms, exploratory data analytics, optimization, and/or the like. The present disclosure contemplates that any machine learning algorithm or training (e.g., supervised learning, unsupervised learning, reinforcement learning, self learning, feature learning, anomaly detection, association rules, etc.) and model (e.g., artificial neural networks, decision trees, support vector machines, regression analysis Bayesian networks, etc.) may be used in the embodiments described herein.

Furthermore, the term "product model" may refer to a mathematical model that includes user data associated with a plurality of users. A "product model" as described herein may be utilized for identifying and selecting users to, for example, receive one or more products of a financial institution. A "regulation offending model," however, may refer to a mathematical model configured to or otherwise designed to be non-compliant with respect to a regulatory factor. By way of example, a regulation offending model may be configured to discriminate on the basis of race or religion. As described hereafter, regulation offending models may be configured to analyze a product model with respect to the particular regulatory factor of the regulation offending model. Said differently, a regulatory offending model is designed to intentionally provide a discriminatory result or outcome such that, when used to analyze the product model, the regulatory offending model may operate to determine if the product model also discriminates (e.g., unintentionally or otherwise) with respect to the particular regulatory factor of the regulation offending model.

As used herein, the term "user data database" refers to a data structure or repository for storing user data, regulatory factor data, and the like. Similarly, the "user data" of the user data database may refer to data generated by or associated with a plurality of users or user device. By way of example, the user data may include data relating to race, gender, income, geographic location, employment, birthdate, social security number, home ownership, etc. of various users. The present disclosure contemplates that the user data may refer to any information associated with a user and regulatory factor data may refer to any user data associated with a protected class. The user data database may be accessible by one or more software applications of the regulatory outcome server 200.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., a regulatory outcome server 200) communicably connected via a network 104 to a product model 106, a first regulation offending model 108, and in some embodiments, a second regulation offending model 109. The example system 100 may also include a user data database 110 that may be hosted by the regulatory outcome server 200 or otherwise hosted by devices in communication with the regulatory outcome server 200. Although illustrated connected to the regulatory outcome server 200 via a network 104, the present disclosure contemplates that one or more of the product model 106, the first regulation offending model 108, and/or the second regulation offending model 109 may be hosted and/or stored by the regulatory outcome server 200.

The regulatory outcome server 200 may include circuitry, networked processors, or the like configured to perform some or all of the apparatus-based (e.g., regulatory outcome server-based) processes described herein, and may be any suitable network server and/or other type of processing device. In this regard, regulatory outcome server 200 may be embodied by any of a variety of devices. For example, the regulatory outcome server 200 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the regulatory outcome server 200 may be located remotely from the product model 106, the first regulation offending model 108, the second regulation offending model 109, and/or user data database 110, although in other embodiments, the regulatory outcome server 200 may comprise the product model 106, the first regulation offending model 108, the second regulation offending model 109, and/or the user data database 110. The regulatory outcome server 200 may, in some embodiments, comprise several servers or computing devices performing interconnected and/or distributed functions. Despite the many arrangements contemplated herein, the regulatory outcome server 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

As described above, the product model 106 may refer to a mathematical model that includes user data associated with a plurality of users. The product model 106 may predict or infer tasks to be performed based upon training data (e.g., user data), learning algorithms, exploratory data analytics, optimization, and/or the like. The present disclosure contemplates that any machine learning algorithm or training (e.g., supervised learning, unsupervised learning, reinforcement learning, self learning, feature learning, anomaly detection, association rules, etc.) and model (e.g., artificial neural networks, decision trees, support vector machines, regression analysis Bayesian networks, etc.) may be used for the product model 106. By way of example, the product model 106 may include user data associated with a plurality of users and trained to identify and select customers for receiving a mortgage-related or credit-related offer. Although described herein with reference to a mortgage-related or credit-related offer, the present disclosure contemplates that the product model 106 may be configured for any product or similar use based upon the intended application of the associated entity. As described above, the product model 106 may be supported separately from the regulatory outcome server 200 (e.g., by a respective computing device) or may be supported by one or more other devices illustrated in FIG. 1.

As described above, the first regulation offending model 108 may refer to a mathematical model configured to or otherwise designed for a particular regulatory factor (e.g., a first regulatory factor). By way of example and as described hereafter, a first regulation offending model 108 may be designed to be intentionally non-compliant with respect to a first regulatory factor. As described hereafter, the first regulation offending model 108 may be configured to analyze the product model 106 with respect to the first regulatory factor of the first regulation offending model 108. Similarly, the second regulation offending model 109 may refer to a mathematical model configured to or otherwise designed for a particular regulatory factor (e.g., a second regulatory factor) different from the first regulatory factor. By way of example and as described hereafter, a second regulation offending model may be designed to be intentionally non-compliant with respect to a second regulatory factor. As described hereafter, the second regulation offending model 109 may be configured to analyze the product model 106 with respect to the second regulatory factor of the second regulation offending model 109. As described above, the first regulation offending model 108 and/or the second regulation offending model 109 may be supported separately from the regulatory outcome server 200 (e.g., by respective computing devices) or may be supported by one or more other devices illustrated in FIG. 1.

The user data database 110 may be stored by any suitable storage device configured to store some or all of the information described herein (e.g., memory 204 of the regulatory outcome server 200 or a separate memory system separate from the regulatory outcome server 200, such as one or more database systems, backend data servers, network databases, cloud storage devices, or the like provided by another device (e.g., online application or $3^{rd}$ party provider) or the product or first regulation offending models 106, 108. The user data database 110 may comprise data received from the regulatory outcome server 200 (e.g., via a memory 204 and/or processor(s) 202), the product model 106, the first regulation offending model 108, and/or the second regulation offending model 109 and the corresponding storage device may thus store this data.

Figure 2:
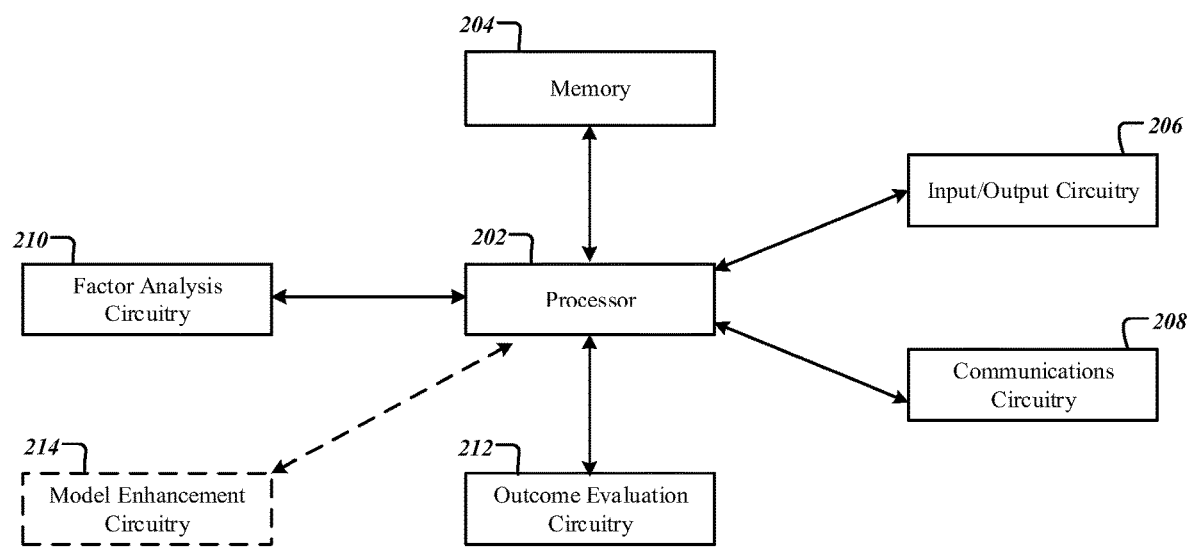
FIG. 2 illustrates a schematic block diagram of example circuitry that may perform various operations, in accordance with some example embodiments described herein.

As illustrated in FIG. 2, the regulatory outcome server 200 may include a processor 202, a memory 204, communications circuitry 208, and input/output circuitry 206. Moreover, the regulatory outcome server 200 may include factor analysis circuitry 210 and outcome evaluation circuitry 212. The regulatory outcome server 200 may be configured to execute the operations described below in connection with FIGS. 3-5. Although components 202-214 are described in some cases using functional language, it should be understood that the particular implementations necessarily include the use of particular hardware. It should also be understood that certain of these components 202-214 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the regulatory outcome server 200 may be housed within the product model 106, and/or the first regulation offending model 108. It will be understood in this regard that some of the components described in connection with the regulatory outcome server 200 may be housed within one of these devices (e.g., devices supporting the product model 106 and/or first regulation offending model 108), while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the regulatory outcome server 200 may provide or supplement the functionality of particular circuitry.

In some embodiments, the processor 202 (and/or coprocessor or any other processing circuitry assisting or otherwise associated with the processor) may be in communication with the memory 204 via a bus for passing information among components of the regulatory outcome server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the regulatory outcome server 200 to carry out various functions in accordance with example embodiments of the present disclosure.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the regulatory outcome server, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The regulatory outcome server 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms.

The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the regulatory outcome server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the regulatory outcome server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The factor analysis circuitry 210 includes hardware components designed to analyze the product model 106 with the first regulation offending model 108 and/or the second regulation offending model 109. The factor analysis circuitry 210 may further include hardware components for modifying the product model 106 in response to the operations described hereafter. The factor analysis circuitry 210 may utilize processing circuitry, such as the processor 202, to perform its corresponding operations, and may utilize memory 204 to store collected information.

The outcome evaluation circuitry 212 includes hardware components designed to generate a first regulation compliance score (or second regulation compliance score) for the first regulatory factor (and/or the second regulatory factor). The outcome evaluation circuitry 212 may also be configured to determine whether the first regulation compliance score satisfies a first regulatory factor threshold. Similarly, the outcome evaluation circuitry 212 may also be configured to determine whether the second regulation compliance score satisfies a second regulatory factor threshold. The outcome evaluation circuitry 212 may utilize processing circuitry, such as the processor 202, to perform its corresponding operations, and may utilize memory 204 to store collected information.

The model enhancement circuitry 214 includes hardware components designed to modify a product model and or generate a modified product model. The model enhancement circuitry 214 may utilize processing circuitry, such as the processor 202, to perform its corresponding operations, and may utilize memory 204 to store collected information.

It should also be appreciated that, in some embodiments, the factor analysis circuitry 210, the outcome evaluation circuitry 212, and/or the model enhancement circuitry 214 may include a separate processor, specially configured field programmable gate array (FPGA), or application specific interface circuit (ASIC) to perform its corresponding functions.

In addition, computer program instructions and/or other type of code may be loaded onto a computer, processor, or other programmable regulatory outcome server's circuitry to produce a machine, such that the computer, processor other programmable circuitry that execute the code on the machine create the means for implementing the various functions, including those described in connection with the components of regulatory outcome server 200.

As described above and as will be appreciated based on this disclosure, embodiments of the present disclosure may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Improved Model Compliance

Figure 3:
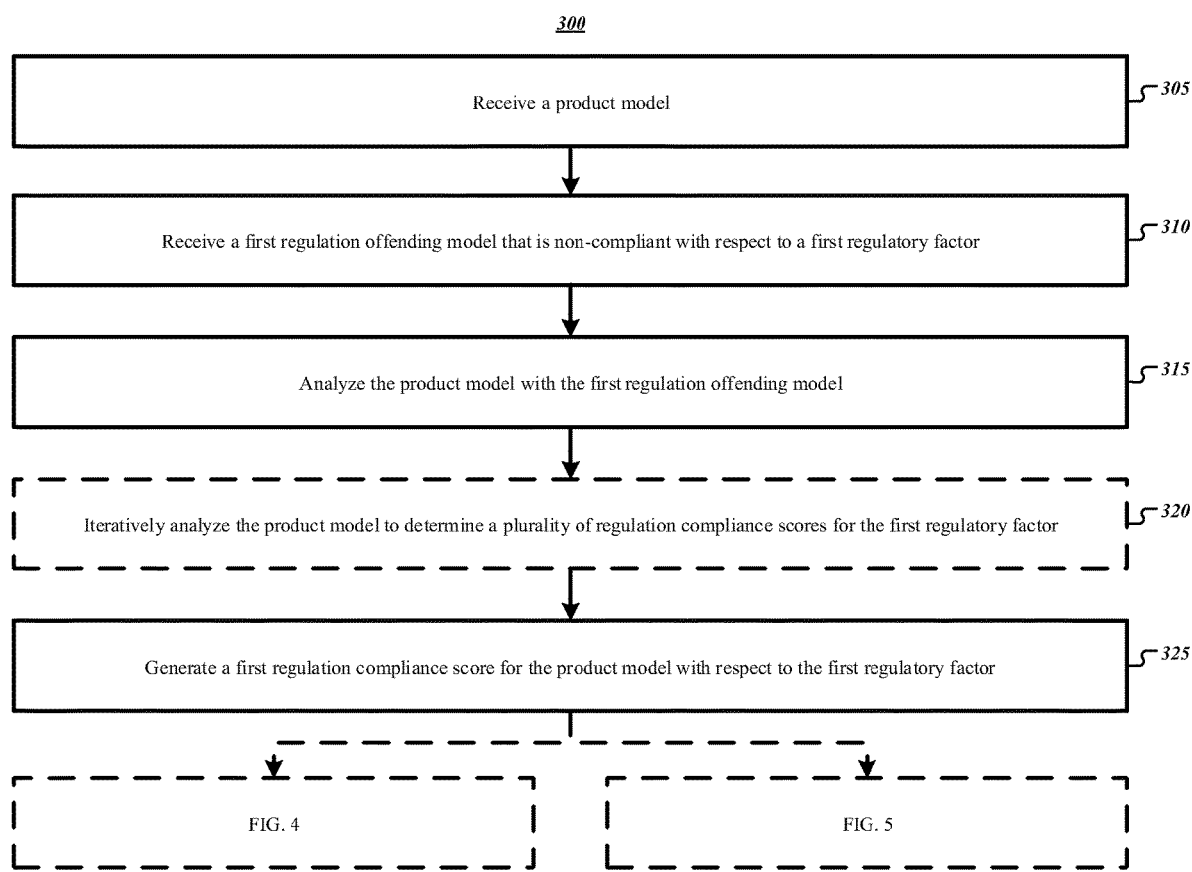
FIG. 3 illustrates an example flowchart for improved model compliance including a first regulation offending model, in accordance with some example embodiments described herein.

FIG. 3 illustrates a flowchart containing a series of operations for improved model compliance. The operations illustrated in FIG. 3 may, for example, be performed by, with the assistance of, and/or under the control of an apparatus (e.g., regulatory outcome server 200), as described above. In this regard, performance of the operations may invoke one or more of processor 202, memory 204, input/output circuitry 206, communications circuitry 208, factor analysis circuitry 210, and/or outcome evaluation circuitry 212.

As shown in operation 305, the apparatus (e.g., regulatory outcome server 200) includes means, such as input/output circuitry 206, communications circuitry 208, or the like, for receiving a product model 106. As described above, the product model 106 may include user data associated with a plurality of users. By way of example, the product model 106 may be trained by user data associated with a plurality of users, for example, of a financial institution. The user data for the plurality of users may also include user data related to one or more regulatory factors (e.g., age, ethnicity, gender, geographic location, employment, home ownership, or the like). Although described herein with reference to the regulatory outcome server 200 receiving the product model 106, over the network 104 or the like, the present disclosure contemplates that, in some embodiments, the regulatory outcome server 200 may be configured to generate or otherwise create the product model 106.

The product model 106 may be configured to identify and/or select, for example, customers of a financial institution for a particular product. By way of example, the product model 106 may be generated by user data of a plurality of users (e.g., customers of the financial institution) and may include user data related to a plurality of regulatory factors (e.g., age, ethnicity, religion, gender, geographic location, employment, home ownership, or other user data). The product model 106 may be trained by this user data to identify, for example, customers to receive a mortgage related product. As described above, however, financial institutions (e.g., associated with the regulatory outcome serve) may be subject to various fair lending regulations that limit the type of user data that may be considered and require that the outcome of the product model 106 prevent discrimination of users in protected classes (e.g., based upon race, religion, national origin, gender, marital status, age, or the like). Said differently, financial institutions may be concerned that their product models (e.g., product model 106) have a discriminatory outcome or effect (unintentional or otherwise). As such, the operations described hereafter with respect to the first regulation offending model 108 may be configured to identify potential regulatory model compliance concerns with the product model 106.

Thereafter, as shown in operation 310, the apparatus (e.g., regulatory outcome server 200) includes means, such as input/output circuitry 206, communication circuitry 208, or the like, for receiving a first regulation offending model 108. As described above, the first regulation offending model 108 may refer to a mathematical model configured to or otherwise designed to be non-compliant with respect to a regulatory factor (e.g., a first regulatory factor). By way of example, a first regulation offending model 108 may be configured to be non-compliant with regard to race. Said differently, the first regulation offending model 108 may be configured to provide products (e.g., a mortgage product) to customers and intentionally have a discriminatory effect based upon race. As described hereafter with reference to operation 315, the first regulation offending model 108 may be configured to analyze the product model 106 with respect to the first regulatory factor of the first regulation offending model 108. Although described herein with reference to the regulatory outcome server 200 receiving the first regulation offending model 108, over the network 104 or the like, the present disclosure contemplates that, in some embodiments, the regulatory outcome server 200 may be configured to generate or otherwise create the first regulation offending model 108. Although described hereafter with reference to a first regulation offending model 108 that is non-compliant with regard to race, the present disclosure contemplates that the first regulation offending model 108 may be configured to provide a discriminatory outcome (e.g., be non-compliant with regard to) any protected class as described above.

Thereafter, as shown in operation 315, the apparatus (e.g., regulatory outcome server 200) includes means, such as processor 202, factor analysis circuitry 210, or the like, for analyzing the product model 106 with the first regulation offending model 108. As described above, the first regulation offending model 108 may be non-compliant with respect to the first regulatory factor (e.g., race) and may be configured to analyze the product model 106 to identify similarities between the product model 106 and the first regulation offending model 108. By way of example, the product model 106 may include a plurality of users, a portion of which are selected by the product model 106 to receive the product (for example a mortgage product) of the product model 106. Similarly, the product model 106 may further include users that are not selected by the product model 106 to receive the product of the product model 106. The first regulation offending model 108 may be configured to analyze the user data used by the product model 106 for a particular user (e.g., iteratively for each user in the plurality) and determine if the first regulation offending model 108 similarly selects the same users to receive and to not receive the product.

By way of further example, the product model 106 may include data for a particular user that does not include data associated with the first regulatory factor (e.g., race). As such, the product model 106 may avoid selecting users to receive the product based upon discriminatory factors. The first regulation offending model 108 may be configured to intentionally discriminate based on the first regulatory factor (e.g., race) such that users in the first regulation offending model 108 are selected to receive the product based upon the first regulatory factor (e.g., race). As described hereafter, the first regulation offending model 108 may analyze the product model 106 by comparing the users selected by (e.g., and not selected by) the product model 106 with the users selected by (e.g., and not selected by) the first regulation offending model 108 to determine any potential discriminatory effect.

In some embodiments, as shown in operation 320, the apparatus (e.g., regulatory outcome server 200) includes means, such as processor 202, factor analysis circuitry 210, or the like, for iteratively analyzing the product model 106 to determine a plurality of regulation compliance scores for the first regulatory factor. Said differently, the first regulation offending model 108 may, in some embodiments, iteratively compare the outcome (e.g., user selected or not) of the product model 106 with the first regulation offending model 108 several times (e.g., any sufficient number of iterations based upon the intended application) such that each iteration of the analysis at operations 315, 320 includes a respective regulation compliance score as described hereafter. In doing so, the regulatory outcome server 200 may operate to remove variability (e.g., outliers, false positives, etc.) associate with small sample sizes (e.g., a single comparative analysis).

Thereafter, as shown in operation 325, the apparatus (e.g., regulatory outcome server 200) includes means, such as processor 202, outcome evaluation circuitry 212, or the like, for a generating a first regulation compliance score for the first regulatory factor. In response to the analysis at operation 315, the regulatory outcome server 200 may generate a regulation compliance score based upon the comparisons between the first regulation offending model 108 with respect to the first regulatory factor of the product model 106. By way of continued example, the product model 106 may include, for example, user data associated with one thousand (e.g., 1,000) users. The product model 106 may, based upon analysis of the user data associated with the one thousand (e.g., 1,000) users, select five hundred (e.g., 500) users to receive the product (for example a mortgage product) of the product model 106. Although described above with reference to selecting five hundred (e.g., 500) users to receive the product, the present disclosure contemplates that any number of users may be selected. Said differently, the comparison between the product model 106 and the first regulation offending model 108 may, in some embodiments, only determine similarity between the selections of the models without consideration of the overall selection percentage of the respective models.

At operation 315, the first regulation offending model 108 may analyze each user of the product model 106 and may determine if each user should receive the product while also accounting for the race of the user (e.g., a known discriminatory effect). If, for example, the first regulation offending model 108 makes the same determination (e.g., selected or not) as the product model 106 for eight hundred (e.g., 800) users, the first regulation compliance score may be 0.8 (e.g., an 80% similarity between the product model 106 and the first regulation offending model 108. This may indicate a high likelihood of discriminatory effect of the product model 106 with respect to the first regulatory factor (e.g., race). In other embodiments, the first regulation offending model 108 may make the same determination (e.g., selected or not) as the product model 106 for two hundred (e.g., 200) users. In such an embodiment, the first regulation compliance score may be 0.2 (e.g., an 20% similarity between the product model 106 and the first regulation offending model 108) and may indicate a low likelihood of discriminatory effect of the product model 106 with respect to the first regulatory factor (e.g., race). In other embodiments, the comparison between the product model 106 and the first regulation offending model 108 may only determine similarity between users that are not selected by the product model 106 (e.g., selected users may be presumed to be non-discriminatory).

In some embodiments, as described above with reference to operation 320, the first regulation offending model 108 may iteratively analyze the product model 106 to determine a plurality of regulation compliance scores for the first regulatory factor. Said differently, the first regulation offending model 108 may, in some embodiments, perform iterative comparisons between the first regulation offending model 108 and the product model 106 (e.g., any sufficient number of iterations based upon the intended application) such that each iteration of the analysis at operations 315, 320 includes a respective regulation compliance score as described hereafter. In doing so, the first regulation offending model 108 may generate a plurality of regulation compliance scores associated with respective iterations. For example, a first iteration may result in a regulation compliance score of 0.5 (e.g., a 50% similarity between the product model 106 and the first regulation offending model 108), a second iteration may result in a regulation compliance score of 0.55 (e.g., a 55% similarity between the product model 106 and the first regulation offending model 108), and a third iteration may result in a regulation compliance score of 0.60 (e.g., a 60% similarity between the product model 106 and the first regulation offending model 108). In such an embodiment, the regulatory outcome server 200 may average the plurality of regulation compliance scores such that the first regulation compliance score is an average of the respective plurality of regulation compliance scores (e.g., 0.55 or a 55% similarity). In other embodiments, the first regulation compliance score may be selected as the maximum absolute value from amongst the plurality of regulation compliance scores (e.g., 0.60 or 60% similarity).

Figure 4:
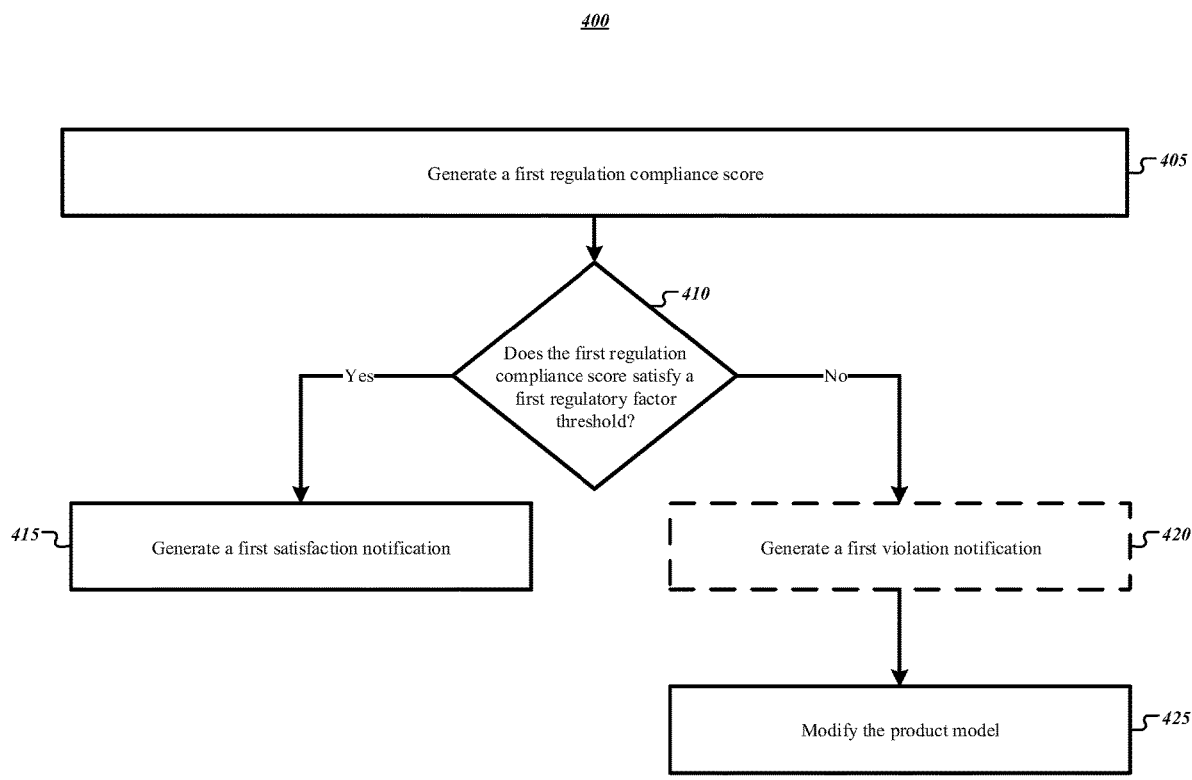
FIG. 4 illustrates an example flowchart for regulation compliance score determinations, in accordance with some example embodiments described herein.

Turning next to FIG. 4, a flowchart is shown for regulation compliance score determinations. The operations illustrated in FIG. 4 may, for example, be performed by, with the assistance of, and/or under the control of an apparatus (e.g., regulatory outcome server 200), as described above. In this regard, performance of the operations may invoke one or more of processor 202, memory 204, input/output circuitry 206, communications circuitry 208, factor analysis circuitry 210, and/or outcome evaluation circuitry 212.

As shown in operation 405, the apparatus (e.g., regulatory outcome server 200) includes means, such as input/output circuitry 206, communications circuitry 208, outcome evaluation circuitry 212, or the like, for generating a first regulation compliance score for the first regulatory factor. As described above with reference to operation 325, the apparatus may generate a regulation compliance score based upon the comparisons between the product model 106 and the first regulation offending model 108.

As shown in operation 410, the apparatus (e.g., regulatory outcome server 200) includes means, such as input/output circuitry 206, communications circuitry 208, outcome evaluation circuitry 212, or the like, for determining whether the first regulation compliance score satisfies a first regulatory factor threshold. By way of example, the regulatory outcome server 200 may include one or more regulation offending thresholds each of which is associated with a particular regulatory factor. These regulation offending thresholds may, in some embodiments, be user inputted, controlled by applicable regulations, and/or independently determined by the regulatory outcome server 200. Furthermore, each of the regulation offending factor thresholds, may, in some embodiments be different from other regulation offending factor thresholds. Each regulatory factor threshold may also be variable or otherwise dynamically adjusted based upon the intended application of the regulatory outcome server 200.

With continued reference to operation 410, the first regulation compliance score may be compared with the first regulatory factor threshold to determine whether the first regulation compliance score satisfies the first regulatory factor threshold. By way of continued example, the first regulatory factor threshold may be defined as 0.35 such that any first regulation compliance score that exceeds the 0.35 first regulatory factor threshold fails to satisfy the first regulatory factor threshold. In an instance in which the first regulation compliance score fails to exceed 0.35 (e.g., is less than 0.35), the regulatory outcome server may determine that the first regulation compliance score satisfies the first regulatory factor threshold at operation 410. In such an instance, the apparatus (e.g., regulatory outcome server 200) may include means, such as input/output circuitry 206, communications circuitry 208, or the like, for generating a first satisfaction notification at operation 415. In some embodiments, the first satisfaction notification at operation 415 may be presented to a user for review. In other embodiments, the first satisfaction notification at operation 415 may be logged, stored, or otherwise recorded by the regulatory outcome server 200. In an instance in which the first regulation compliance score fails to satisfy the first regulatory factor threshold, the apparatus (e.g., regulatory outcome server 200) may include means, such as input/output circuitry 206, communications circuitry 208, or the like, for generating a first violation notification at operation 420. Although described herein with reference to a first violation notification, the present disclosure contemplates that any number of notifications (e.g., multiple notifications, cascading notifications, or the like) may be provided.

In an instance in which the first regulation compliance score fails to satisfy the first regulatory factor threshold, as shown in operation 425, the apparatus (e.g., regulatory outcome server 200) includes means, such as processor 202, the factor analysis circuitry 210, the model enhancement circuitry 214, or the like, for modifying the product model 106. As described above, an instance in which the first regulation compliance score fails to satisfy the first regulatory factor threshold, may indicate that the potential discriminatory effect with respect to the first regulatory factor is too high or otherwise unacceptable.

By way of continued example to a regulatory factor associated with race, the first regulation offending model 108 may determine sufficient similarity between the product model 106 and the first regulation offending model 108 (e.g., exceeding the first regulatory factor threshold) such that the product model 106 has a relatively high risk for discriminatory effect with regard to race. As such, the regulatory outcome server 200 may, at operation 425, operate to modify the product model 106 to compensate for this discrimination risk. By way of example, the regulatory outcome server 200 may identify and remove user data from the product model 106 that results in similarities with the first regulation offending model 108. In some embodiments, the regulatory outcome server 200 may iteratively remove and/or replace user data and perform the operations of FIGS. 3-4 until the first regulation compliance score satisfies the first regulatory factor threshold.

Figure 5:
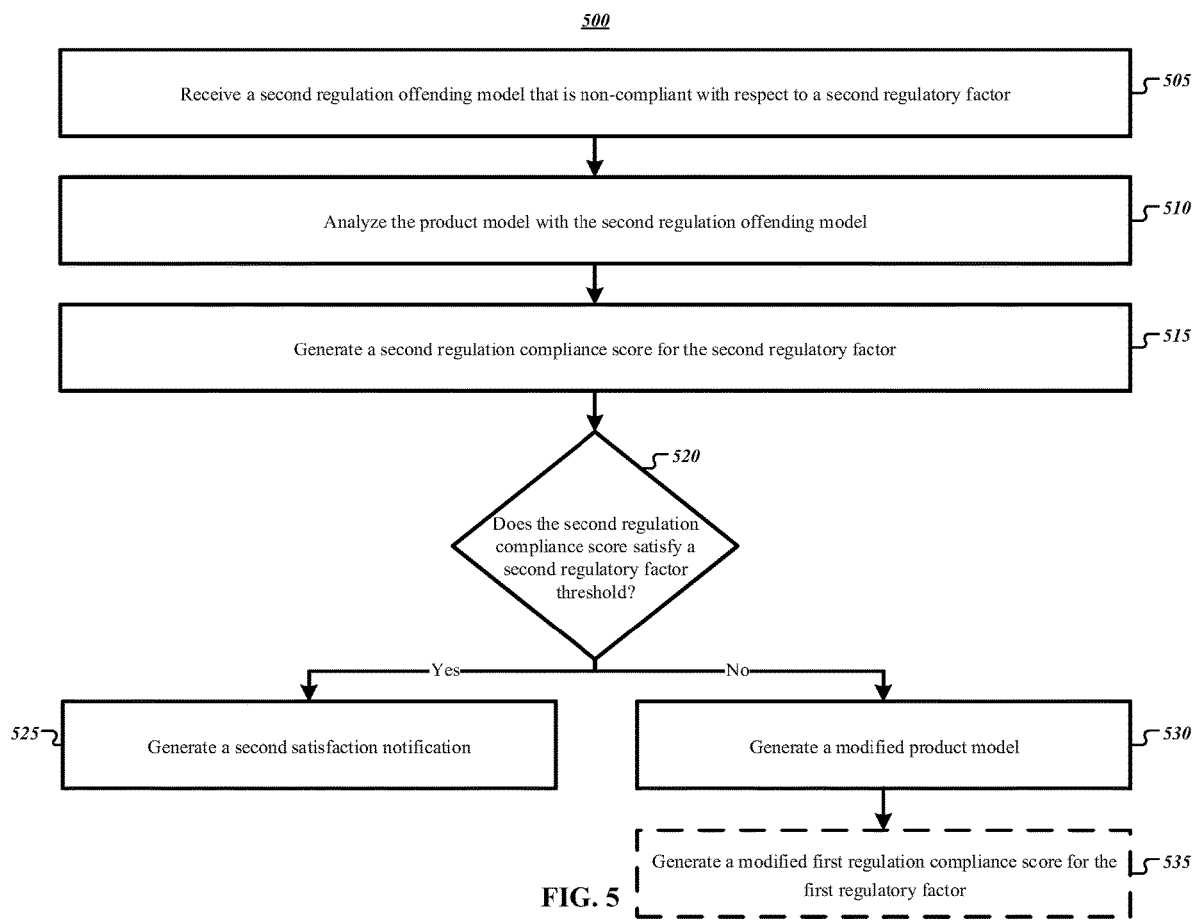
FIG. 5 illustrates an example flowchart for improved model compliance including a second regulation offending model, in accordance with some example embodiments described herein.

Turning next to FIG. 5, a flowchart is shown for improved model compliance including a second regulation offending model. The operations illustrated in FIG. 5 may, for example, be performed by, with the assistance of, and/or under the control of an apparatus (e.g., regulatory outcome server 200), as described above. In this regard, performance of the operations may invoke one or more of processor 202, memory 204, input/output circuitry 206, communications circuitry 208, and/or factor analysis circuitry 210, outcome evaluation circuitry 212.

As shown in operation 505, the apparatus (e.g., regulatory outcome server 200) includes means, such as input/output circuitry 206, communications circuitry 208, or the like, for receiving a second regulation offending model 109, wherein the second regulation offending model 109 may refer to a mathematical model configured to or otherwise designed to be non-compliant with respect to a regulatory factor (e.g., a second regulatory factor). As such, the regulatory outcome server 200, as illustrated in FIG. 5, may further determine any potential regulation compliance associated with additional regulatory factors via respective regulation offending models. Although described hereafter with reference to a second regulation offending model 109, the present disclosure contemplates that any number of regulation offending models may be employed by the regulatory outcome server 200.

As described above, the second regulation offending model 109 may refer to a mathematical model configured to or otherwise designed to be non-compliant with respect to a regulatory factor (e.g., a second regulatory factor). By way of example, a second regulation offending model 109 may be configured to be non-compliant with regard to religion. Said differently, the second regulation offending model 109 may be configured to provide products (e.g., a mortgage product) to customer and intentionally have a discriminatory effect based upon religion. As described hereafter with reference to operation 510, the second regulation offending model 109 may be configured to analyze the product model 106 with respect to the second regulatory factor of the second regulation offending model 109. Although described herein with reference to the regulatory outcome server 200 receiving the second regulation offending model 109, over the network 104 or the like, the present disclosure contemplates that, in some embodiments, the regulatory outcome server 200 may be configured to generate or otherwise create the second regulation offending model 109. Although described hereafter with reference to a second regulation offending model 109 that is non-compliant with regard to religion, the present disclosure contemplates that the second regulation offending model 109 may be configured to provide a discriminatory outcome (e.g., be non-compliant with regard to) any protected class as described above.

Thereafter, as shown in operation 510, the apparatus (e.g., regulatory outcome server 200) includes means, such as processor 202, factor analysis circuitry 210, or the like, for analyzing the product model 106 with the second regulation offending model 109. As described above, the second regulation offending model 109 may be non-compliant with respect to the second regulatory factor (e.g., religion) and may be configured to analyze the product model 106 to identify similarities between the product model 106 and the second regulation offending model 109. By way of example, the product model 106 may include a plurality of users, a portion of which are selected by the product model 106 to receive the product (for example a mortgage product) of the product model 106. Similarly, the product model 106 may further include users that are not selected by the product model 106 to receive the product of the product model 106. The second regulation offending model 109 may be configured to analyze the user data used by the product model 106 for a particular user (e.g., iteratively for each user in the plurality) and determine if the second regulation offending model 109 similarly selects the same users to receive and to not receive the product.

By way of further example, the product model 106 may include data for a particular user that does not include data associated with the second regulatory factor (e.g., religion). As such, the product model 106 may avoid selecting users to receive the product based upon discriminatory factors. The second regulation offending model 109 may be configured to intentionally discriminate based on the second regulatory factor (e.g., religion) such that users in the second regulation offending model 109 are selected to receive the product based upon the second regulatory factor (e.g., religion). As described hereafter, the second regulation offending model 109 may analyze the product model 106 by comparing the users selected by (e.g., and not selected by) the product model 106 with the users selected by (e.g., and not selected by) the second regulation offending model 109 to determine any potential discriminatory effect.

Thereafter, as shown in operation 515, the apparatus (e.g., regulatory outcome server 200) includes means, such as processor 202, outcome evaluation circuitry 212, or the like, for a generating a second regulation compliance score for the second regulatory factor. In response to the analysis at operation 510, the regulatory outcome server 200 may generate a second regulation compliance score based upon the comparisons between the second regulation offending model 109 with respect to the second regulatory factor of the product model 106. By way of continued example, the product model 106 may include, for example, user data associated with one thousand (e.g., 1,000) users. The product model 106 may, based upon analysis of the user data associated with the one thousand (e.g., 1,000) users, select five hundred (e.g., 500) users to receive the product (for example a mortgage product) of the product model 106. Although described above with reference to selecting five hundred (e.g., 500) users to receive the product, the present disclosure contemplates that any number of users may be selected. Said differently, the comparison between the product model 106 and the second regulation offending model 109 may, in some embodiments, only determine similarity between the selections of the models without consideration of the overall selection percentage of the respective models.

The second regulation offending model 109 may analyze each user of the product model 106 and may determine if each user should receive the product while accounting for the religion of the user (e.g., discriminating based upon religion). If, for example, the second regulation offending model 109 makes the same determination (e.g., selected or not) as the product model 106 for seven hundred (e.g., 700) users, the second regulation compliance score may be 0.7 (e.g., an 70% similarity between the product model 106 and the second regulation offending model 109.) This may indicate a high likelihood of discriminatory effect of the product model 106 with respect to the second regulatory factor (e.g., religion). In other embodiments, the second regulation offending model 109 may make the same determination (e.g., selected or not) as the product model 106 for two hundred and fifty (e.g., 250) users. In such an embodiment, the second regulation compliance score may be 0.25

(e.g., an 25% similarity between the product model 106 and the second regulation offending model 109) and may indicate a low likelihood of discriminatory effect of the product model 106 with respect to the second regulatory factor (e.g., religion). In other embodiments, the comparison between the product model 106 and the second regulation offending model 109 may only determine similarity between users that are not selected by the product model 106 (e.g., selected users are presumed to be non-discriminatory).

As shown in operation 520, the apparatus (e.g., regulatory outcome server 200) includes means, such as input/output circuitry 206, communications circuitry 208, outcome evaluation circuitry 212, or the like, for determining whether the second regulation compliance score satisfies a second regulatory factor threshold. As described above with reference to operation 410, the second regulation compliance score may be compared with the second regulatory factor threshold to determine whether the second regulation compliance score satisfies the second regulatory factor threshold. By way of example, the second regulatory factor threshold may be defined as 0.4 such that any second regulation compliance score that exceeds the 0.4 second regulatory factor threshold fails to satisfy the second regulatory factor threshold. In an instance in which the second regulation compliance score fails to exceed 0.4 (e.g., is less than 0.4), the regulatory outcome server 200 may determine that the second regulation compliance score satisfies the second regulatory factor threshold at operation 520. In such an instance, the apparatus (e.g., regulatory outcome server 200) may include means, such as input/output circuitry 206, communications circuitry 208, or the like, for generating a second satisfaction notification at operation 525. In some embodiments, the second satisfaction notification at operation 525 may be presented to a user for review. In other embodiments, the second satisfaction notification at operation 525 may be logged, stored, or otherwise recorded by the regulatory outcome server 200.

In an instance in which the second regulation compliance score fails to satisfy the second regulatory factor threshold, as shown in operation 520, the apparatus (e.g., regulatory outcome server 200) includes means, such as processor 202, the factor analysis circuitry 210, the model enhancement circuitry 214, or the like, for modifying the product model 160 to generate an modified product model at operation 530. As described above, an instance in which the second regulation compliance score fails to satisfy the second regulatory factor threshold, may indicate that the potential discriminatory effect with respect to the second regulatory factor is too high or otherwise unacceptable.

By way of continued example to a regulatory factor associated with religion, the second regulation offending model 109 may determine sufficient similarity between the product model 106 and the second regulation offending model 109 (e.g., exceeding the second regulatory factor threshold) such that the product model 106 has a relatively high risk for discriminatory effect with regard to religion. As such, the regulatory outcome server 200 may, at operation 425, operate to modify the product model 106 to compensate for this discrimination risk. By way of example, the regulatory outcome server 200 may identify and remove user data from the product model 106 that results in similarities with the second regulation offending model 109. In some embodiments, the regulatory outcome server 200 may iteratively remove and/or replace user data and perform the operations of FIGS. 3 and 5 until the second regulation compliance score satisfies the second regulatory factor threshold.

In some embodiments, as shown in operation 535, the apparatus (e.g., regulatory outcome server 200) includes means, such as input/output circuitry 206, communications circuitry 208, outcome evaluation circuitry 212, or the like, for generating a modified first regulation compliance score for the first regulatory factor. As the operations of FIG. 5 are completed to accommodate for the regulatory factor of the second regulation offending model 109, changes to the first regulation compliance score may occur. In order to ensure that the modified product model (e.g., modified to address the second regulatory factor threshold) continues to satisfy the first regulatory factor threshold, the regulatory outcome server 200 may subsequently perform the operations of FIG. 3 as described above.

In doing so, the embodiments of the present disclosure solve these issues by utilizing regulation offending models designed to identify vulnerable regulatory factors associated with user data of a product model (e.g., machine learning model) to prevent unintentional discriminatory outcomes of the product model. In operation, embodiments of the present disclosure may receive a product model that includes user data associated with a plurality of users. A regulation offending model that is non-compliant with respect to a first regulatory factor may be used to analyze the product model to generate a regulation compliance score related to said regulatory factor. In instances in which the regulation compliance score fails to satisfy one or more compliance-related thresholds, embodiments of the present disclosure may generate a violation notification and/or modify the product model. In this way, the inventors have identified that the advent of emerging computing technologies have created a new opportunity for solutions for improving model compliance which were historically unavailable. In doing so, such example implementations confront and solve at least two technical challenges: (1) they determine potential regulatory factor vulnerabilities associated with machine learning techniques, (2) they perform risk-based assessments of product models, and (3) they dynamically adjust user data modeling to ensure regulation related compliance.

FIGS. 3-5 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the regulatory outcome server 200 and executed by a processor 202 of the regulatory outcome server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for improved machine learning (ML) model compliance, the method comprising:
    receiving, via a computing device, a product ML model, wherein the product ML model is trained on user data associated with a plurality of users;
    selecting, with the product ML model, a first portion of the plurality of users to receive a product associated with the product ML model;
    receiving, via the computing device, a first regulation offending ML model, wherein the first regulation offending ML model is configured to be non-compliant with respect to a first regulatory factor;
    selecting, with the first regulation offending ML model, a second portion of the plurality of users to receive the product associated with the product ML model, wherein selection of the second portion of the plurality of users by the first regulation offending ML model is non-compliant with respect to the first regulatory factor;
    analyzing, via factor analysis circuitry of the computing device, the product ML model with the first regulation offending ML, model by comparing the first portion of the plurality of users selected by the product ML model with the second portion of the plurality of users selected by the first regulation offending ML model;
    generating, via outcome evaluation circuitry of the computing device, a first regulation compliance score for the product ML model with respect to the first regulatory factor based upon the comparison; and
    modifying, via the factor analysis circuitry, the product ML model based upon the first regulation compliance score.

2. The method according to claim 1, further comprising:
    determining, via the outcome evaluation circuitry, whether the first regulation compliance score satisfies a first regulatory factor threshold; and
    generating, via communications circuitry of the computing device, a first violation notification in an instance in which the first regulation compliance score fails to satisfy the first regulatory factor threshold.

3. The method according to claim 1, wherein modifying the product ML model based upon the first regulation compliance score further comprises:
    determining, via the outcome evaluation circuitry, whether the first regulation compliance score satisfies a first regulatory factor threshold; and
    modifying, via the factor analysis circuitry, the product ML model in an instance in which the first regulation compliance score fails to satisfy the first regulatory factor threshold.

4. The method according to claim 1, wherein analyzing the product ML model with the first regulation offending ML model further comprises iteratively analyzing the product ML model, via the factor analysis circuitry, to determine a plurality of regulation compliance scores for the first regulatory factor.

5. The method according to claim 4, wherein generating the first regulation compliance score for the first regulatory factor further comprises averaging the plurality of regulation compliance scores.

6. The method according to claim 4, wherein generating the first regulation compliance score for the first regulatory factor further comprises selecting the maximum absolute value from amongst the plurality of regulation compliance scores.

7. The method according to claim 1, further comprising:
    receiving, via the computing device, a second regulation offending ML model, wherein the second regulation offending ML model is non-compliant with respect to a second regulatory factor, and wherein the second regulatory factor is associated with a protected class;
    selecting, with the second regulation offending ML model, a third portion of the plurality of users to receive the product associated with the product ML model, wherein selection of the third portion of the plurality of users by the second regulation offending ML model discriminates with respect to the protected class;
    analyzing, via the factor analysis circuitry, the product ML model with the second regulation offending ML model by comparing the first portion of the plurality of users selected by the product ML model with the third portion of the plurality of users selected by the second regulation offending ML model; and
    generating, via the outcome evaluation circuitry, a second regulation compliance score for the second regulatory factor.

8. The method according to claim 7, further comprising:
    determining, via the outcome evaluation circuitry, whether the second regulation compliance score satisfies a second regulatory factor threshold; and
    modifying, via the factor analysis circuitry, the product ML model in an instance in which the second regulation compliance score fails to satisfy the second regulatory factor threshold.

9. The method according to claim 8, further comprising:
analyzing, via the factor analysis circuitry, the modified product ML model with the first regulation offending ML, model by comparing a fourth portion of the plurality of users selected by the modified product ML model with the second portion of the plurality of users selected by the first regulation offending ML model; and
generating, via the outcome evaluation circuitry, a modified first regulation compliance score for the first regulatory factor.

10. An apparatus for improved machine learning (ML) model compliance comprising at least one processor and at least one memory, the at least one memory having computer-code instructions stored thereon that, in execution with the at least one processor, configure, the apparatus to:
receive a product ML model, wherein the product ML model is trained on user data associated with a plurality of users;
select, with the product ML model, a first portion of the plurality of users to receive a product associated with the product ML model;
receive a first regulation offending ML model, wherein the first regulation offending ML model is configured to be non-compliant with respect to a first regulatory factor;
select, with the first regulation offending ML model, a second portion of the plurality of users to receive the product associated with the product ML model, wherein selection of the second portion of the plurality of users by the first regulation offending ML model is non-compliant with respect to the first regulatory factor;
analyze the product ML model with the first regulation offending ML model by comparing the first portion of the plurality of users selected by the product ML model with the second portion of the plurality of users selected by the first regulation offending ML model;
generate a first regulation compliance score for the product ML model with respect to the first regulatory factor based upon the comparison; and
modify the product ML model based upon the first regulation compliance score.

11. The apparatus according to claim 10, wherein the at least one memory includes computer-code instructions stored thereon that, in execution with the at least one processor further configure the apparatus to:
determine whether the first regulation compliance score satisfies a first regulatory factor threshold; and
generate a first violation notification in an instance in which the first regulation compliance score fails to satisfy the first regulatory factor threshold.

12. The apparatus according to claim 10, wherein to modify the product ML model based upon the first regulation compliance score, the at least one memory includes computer-code instructions stored thereon that, in execution with the at least one processor further configure the apparatus to:
determine whether the first regulation compliance score satisfies a first regulatory factor threshold; and
modify the product ML model in an instance in which the first regulation compliance score fails to satisfy the first regulatory factor threshold.

13. The apparatus according to claim 10, wherein the at least one memory includes computer-code instructions stored thereon that, in execution with the at least one processor further configure the apparatus to iteratively analyze the product ML model to determine a plurality of regulation compliance scores for the first regulatory factor.

14. The apparatus according to claim 13, wherein the at least one memory includes computer-code instructions stored thereon that, in execution with the at least one processor further configure the apparatus to generate the first regulation compliance score for the first regulatory factor by averaging the plurality of regulation compliance scores.

15. The apparatus according to claim 13, wherein the at least one memory includes computer-code instructions stored thereon that, in execution with the at least one processor further configure the apparatus to generate the first regulation compliance score for the first regulatory factor by selecting the maximum absolute value from amongst the plurality of regulation compliance scores.

16. The apparatus according to claim 10, wherein the at least one memory includes computer-code instructions stored thereon that, in execution with the at least one processor further configure the apparatus to:
receive a second regulation offending ML model, wherein the second regulation offending ML, model is non-compliant with respect to a second regulatory factor, and wherein the second regulatory factor is associated with a protected class;
select, with the second regulation offending ML model, a third portion of the plurality of users to receive the product associated with the product ML model, wherein selection of the third portion of the plurality of users by the second regulation offending ML model discriminates with respect to the protected class;
analyze the product ML model with the second regulation offending ML model by comparing the first portion of the plurality of users selected by the product ML model with the third portion of the plurality of users selected by the second regulation offending ML model; and
generate a second regulation compliance score for the second regulatory factor.

17. The apparatus according to claim 16, wherein the at least one memory includes computer-code instructions stored thereon that, in execution with the at least one processor further configure the apparatus to:
determine whether the second regulation compliance score satisfies a second regulatory factor threshold; and
modify the product ML model in an instance in which the second regulation compliance score fails to satisfy the second regulatory factor threshold.

18. The apparatus according to claim 17, wherein the at least one memory includes computer-code instructions stored thereon that, in execution with the at least one processor further configure the apparatus to:
analyze the modified product ML model with the first regulation offending ML model by comparing a fourth portion of the plurality of users selected by the modified product ML model with the second portion of the plurality of users selected by the first regulation offending ML model; and
generate a modified first regulation compliance score for the first regulatory factor.

19. A non-transitory computer-readable storage medium for using an apparatus for improved model compliance, the non-transitory computer-readable storage medium storing instructions that, when executed, cause the apparatus to:
receive a product ML model, wherein the product ML model is trained on user data associated with a plurality of users;

select, with the product ML model, a first portion of the plurality of users to receive a product associated with the product ML model;

receive a first regulation offending ML model, wherein the first regulation offending ML model is configured to be non-compliant with respect to a first regulatory factor;

select, with the first regulation offending ML model, a second portion of the plurality of users to receive the product associated with the product ML model, wherein selection of the second portion of the plurality of users by the first regulation offending ML model is non-compliant with respect to the first regulatory factor;

analyze the product ML model with the first regulation offending ML model by comparing the first portion of the plurality of users selected by the product ML model with the second portion of the plurality of users selected by the first regulation offending ML model;

generate a first regulation compliance score for the product ML model with respect to the first regulatory factor based upon the comparison; and modify the product ML model based upon the first regulation compliance score.

20. The non-transitory computer-readable storage medium according to claim 19 storing instructions that, when executed, cause the apparatus to:

determine whether the first regulation compliance score satisfies a first regulatory factor threshold; and generate a first violation notification in an instance in which the first regulation compliance score fails to satisfy the first regulatory factor threshold.

\* \* \* \* \*

UNITED STATES PATENT AND TRADEMARK OFFICE
CERTIFICATE OF CORRECTION

PATENT NO. : 11,551,178 B2
APPLICATION NO. : 16/874199
DATED : January 10, 2023
INVENTOR(S) : Ramesh Yarlagadda et al.

Page 1 of 1

It is certified that error appears in the above-identified patent and that said Letters Patent is hereby corrected as shown below:

On the Title Page

Inventors item (72), the second inventor's name - Pierre Arbadjian - should read -- Pierre Arbajian --

Signed and Sealed this
Eleventh Day of March, 2025

Coke Morgan Stewart
*Acting Director of the United States Patent and Trademark Office*